(12) United States Patent
Slafer et al.

(10) Patent No.: US 7,369,483 B2
(45) Date of Patent: May 6, 2008

(54) PRE-FORMATTED LINEAR OPTICAL DATA STORAGE MEDIUM

(75) Inventors: W. Dennis Slafer, Arlington, MA (US);
Matthew White, Cohasset, MA (US);
Milford Kime, Cambridge, MA (US);
Timothy Frey, Hudson, MA (US)

(73) Assignee: MicroContinuum, Inc., Cambridge, MA (US)

( * ) Notice: Subject to any disclaimer, the term of this patent is extended or adjusted under 35 U.S.C. 154(b) by 0 days.

(21) Appl. No.: 10/588,066

(22) PCT Filed: Jan. 21, 2005

(86) PCT No.: PCT/US2005/001864

§ 371 (c)(1),
(2), (4) Date: Dec. 21, 2006

(87) PCT Pub. No.: WO2005/072242

PCT Pub. Date: Aug. 11, 2005

(65) Prior Publication Data

US 2007/0118679 A1    May 24, 2007

Related U.S. Application Data

(60) Provisional application No. 60/537,847, filed on Jan. 21, 2004, provisional application No. 60/538,120, filed on Jan. 21, 2004.

(51) Int. Cl.
*G11B 7/24* (2006.01)
(52) U.S. Cl. .................................. 369/275.4; 369/283
(58) Field of Classification Search ................. None
See application file for complete search history.

(56) References Cited

U.S. PATENT DOCUMENTS

| | | | |
|---|---|---|---|
| 5,942,302 A | 8/1999 | Ha et al. | |
| 5,989,671 A | 11/1999 | Nakayama et al. | |
| 6,275,349 B1 | 8/2001 | Smith | |
| 2002/0114240 A1* | 8/2002 | Chung et al. | 369/53.22 |
| 2005/0063291 A1* | 3/2005 | Tsukamoto | 369/275.4 |

* cited by examiner

*Primary Examiner*—Paul W. Huber
(74) *Attorney, Agent, or Firm*—McDermott Will & Emery LLP (57) ABSTRACT

A pre-formatted optical data storage tape (10) including an elongated linear polymer layer having at least one pattern of optically readable embossments (114) on at least one surface of the polymer layer, and an optical recording layer covering the pattern of optically readable embossments (114) of the elongated linear polymer layer, wherein the optical recording layer is adapted such that recorded marks (120) may be made in the recording layer by directing a focused source of energy into the recording layer.

21 Claims, 6 Drawing Sheets

PRE-FORMATTED LINEAR OPTICAL DATA STORAGE MEDIUM

CROSS-REFERENCE TO RELATED APPLICATIONS

This application is a 371 of PCT/US05/01864, filed Jan. 21, 2005.

The present application claims priority to provisional U.S. patent application Ser. No. 60/537,847, which was filed on Jan. 21, 2004, is assigned to the assignee of the present application, and is incorporated herein by reference.

The present application also claims priority to co-pending provisional U.S. patent application Ser. No. 60/538,120, which was filed on Jan. 21, 2004, is assigned to the assignee of the present application, and is incorporated herein by reference.

FIELD OF THE DISCLOSURE

The present disclosure relates generally to computer data storage and, more particularly, removable media for storing computer data. Even more particularly, the present disclosure relates to pre-formatted linear optical data storage media.

BACKGROUND OF THE DISCLOSURE

In the field of optical and magneto-optical computer information storage systems, it has long been recognized that incorporating physical features into the surface of a storage element, such as a disc or card (hereafter referred to as "media" or "medium"), provides a number of advantages for data storage media. Precise position and tracking, error correction, focusing, and other information can be provided or enhanced by these surface features, and this information is used by the hardware and control system with which the storage element is designed to operate (hereafter referred to as "drive" or "transport"). These surface features are "read" by means of an optical pickup device (hereafter referred to as "optical head" or "optical pickup unit") that is a key component of the drive. Media surface features typically include pits, lands, grooves, and the like. For the majority of optical storage media, the surface features are incorporated into the media (e.g., the disc substrate) at the time of manufacture, and this process is generally referred to as physical pre-formatting (herein "pre-formatting").

In the case of recordable and erasable compact discs ("CD"), digital versatile discs ("DVD"), magneto-optical discs ("MO"), and other media, such pre-formatting is accomplished by means of a molding process, whereby a molten polymer (substrate) material is brought into contacted with a patterning surface ("tool") whose surface contains the mirror-image of a surface relief structure that is to be imparted to the disc surface. For example, U.S. Pat. No. 4,428,069 shows one such method for pre-formatting discs. After sufficient cooling has occurred, the disc is removed from the molding machine, and various layers are applied over this surface relief structure, such as reflective layers, recordable layers, protective layers and the like.

A CD typically has a single spiral track of data, circling from the inside of the disc to the outside of the disc. The spiral track has very fine surface modulations (often in the form of pits, bumps, or grooves) containing features with dimensions in the submicron size range. When a CD is played, a laser beam passes through the CD's polycarbonate substrate layer, reflects off a reflective layer to an optoelectronic device that detects changes in light. The difference in height of the pits, bumps, and grooves relative to the flat parts of the substrate surface results in a change, or modulation, of the reflected light. An optoelectronic sensor in the head detects these changes in reflectivity, and the electronics in the CD-player (drive) interpret the changes as data bits. For pre-recorded information (music, software, etc.), these pits are used to store the data, as well as provide positional information. For recordable or erasable discs, the pre-formatted structures are typically used for positioning, tracking, and writing/erasing user data.

In the present art, a durable tool, often referred to as a "stamper", is used to impart the pattern into the substrate surface and is typically made from a "master" pattern by a metal electroforming or electroless plating process. The master pattern, in turn, is made on a laser beam recorder, a device in which a recording medium, consisting of a photosensitive layer coated on a substrate is rotated on a lathe or spindle and exposed to a modulated laser beam. Chemical development of the exposed pattern results in a surface relief pattern that will ultimately be replicated into the optical disc substrate, as previously described. Although a number of variants exist, such steps as these are typical of the basic manufacturing process of optical discs.

The performance and tolerance requirements of the laser beam recorder systems that create the master patterns are very high and, therefore, the process requires very expensive hardware and optical components, and the laser beam recorder systems must be housed in a clean-room environment. The molding process used to make the polymer substrates mechanically reproduces the master pattern. It should be noted that the relief structures that are molded into the surface of optical storage media are very precise copies of the same features that the laser beam recorder laser inscribes into the master substrate.

The manufacturing process described above dominates the optical disc manufacturing industry and is designed to enable very low-cost media and hardware production. Low-cost production is achieved by placing the requirements for high precision and accuracy in the master pattern step, which is done relatively infrequently. Precision molding is used to make the plastic replicas rapidly and inexpensively and with nearly the same level of precision and accuracy as the original master pattern, as noted above. This approach has enabled the production of low cost discs in high volumes, and for this reason, the process of pre-molding the surface features, for both pre-recorded and recordable/erasable optical discs, has completely replaced early variants in which formatting was incorporated either after the disc was manufactured or "in the field".

The accuracy, precision, and small feature size that can be achieved in a laser beam recorder mastering facility is greater than can be achieved by carrying out this operation in the field, since the relatively inexpensive drives used by industrial an/or consumer optical disc systems do not have the same level of precision as the laser beam recorders used to create the master pattern. The higher information density (i.e., closer and smaller features) achievable by a laser beam recorder, relative to an inexpensive drive, allows more information to be stored on a disc, so thus pre-formatted optical discs have a much higher areal density (measure of the number of bits stored per area) than discs in which such features were written by means of an inexpensive drive with lower resolution capabilities. Accordingly, it is commonly recognized that the low cost and high capacity of today's optical storage discs would not be possible without pre-formatting.

For purposes of the present disclosure, it is also useful to compare the characteristics of the aforementioned optical disc systems to magnetic tape, which is another common form of removable information storage. Magnetic tape recording systems utilize tape media that typically ranges in size from 4 mm to 35 mm in width, and from tens of meters to thousands of meters in length. Magnetic tape is available in a number of physical storage configurations, including open reel, single hub cartridge, and dual spool cassette. Magnetic tape characteristically provides a very large amount of surface area for storing information. By way of comparison, the tape in a typical 120 minute video home system ("VHS") tape cartridge has roughly 250 times more usable surface area than a CD.

In addition to their respective advantages, optical disc and magnetic tape removable information storage systems also suffer from a number of limitations. Disc-based systems, although characteristically having a significantly higher areal density than magnetic tape, are limited by the total available surface area. A number of variations of the basic optical disc exist or have been proposed for overcoming this limitation, including use of multiple layers, multiple sides, gray-scale (multi-level) recording, near-field, fluorescent multi-layers, holographic, to name but a few. These variants of the optical disc, however, only increase the effective surface area by a factor of about 2 to 20 over the basic optical disc design.

Magnetic tape, while having significantly greater surface area than optical discs, suffers from lower areal density. Although very high data density has been achieved with magnetic hard disk systems, the storage density of magnetic tape has lagged behind hard disks by many orders of magnitude. The lower areal density is due to the intrinsic difficulty in controlling the magnetic tape head-media interface as precisely as can be achieved in hard disk systems.

In addition, magnetic tape systems are susceptible to mechanical wear to both magnetic head and media because of the necessary head-media contact and the intrinsic abrasiveness of magnetic media. Some magnetic tape media are also characterized by a limited storage and operational lifetime resulting from degradation of the magnetic media over time.

It would appear useful, therefore, to combine the beneficial aspects of magnetic tape (linear media with a large storage surface area) and optical recording (high areal density and a longer operational lifetime) in an "optical tape". To date, only one such system has been commercialized. This optical tape system is disclosed in U.S. Pat. Nos. 4,567,585 and 5,177,724, and was commercially available from CREO Products of Vancouver Canada. The CREO optical tape system, however, was physically large and very expensive (i.e., $250,000). The CREO optical tape system used 12-inch open reel spools of 35 mm optical tape, which hold 1 Terabyte of data (and initially sold for $10,000 per spool). The tape consists of a dye-polymer-based media developed by ICI ImageData, a subsidiary of ICI (Imperial Chemical Industries of Great Britain), and disclosed in U.S. Pat. No. 5,382,463. This system was not a commercial success and only several dozen units were ever sold. Other optical tape systems have been disclosed in U.S. Pat. Nos. 5,784,168, 5,825,740, 5,802,033, 5,581,534, 5,734,539, 5,120,136, and 6,141,301.

A serious drawback with the previous attempts to carry out optical or magneto-optical recording in a tape format lies in the optical head/media design. Virtually all of the previously-mentioned systems were based on optical head technologies typically built around proprietary single or multi-channel optical read/write head architectures (such as those disclosed in U.S. Pat. Nos. 5,097,457, 4,661,941, 5,673,245, and 4,884,260), with unformatted tape media (such as those disclosed in U.S. Pat. Nos. 5,234,803, 5,382,463, 5,358,759, 5,459,019, 4,904,577, 4,960,680, 5,015,548, 5,196,294, 5,465,241, 5,358,759), all of which rely upon complex and custom optical head designs. These optical tape systems use a variety of read/write technologies, including vertical cavity surface-emitting lasers ("VCSEL") based arrays, magnetically levitated spinning polygons, and multiplexed high-power lasers with custom semiconductor channel modulators. These systems are all based on expensive and/or complex optical head architectures, which considerably increase the cost and development time for such systems. Additional drawbacks to these systems include one or more of the following: the inability of fixed position multiple beam heads to deal with large track pitch variations (e.g., resulting from dimensional changes in the tape substrate), the potential cost and difficulty of replacing one or more head elements when it malfunctions or fails, the difficulty and precision required to align individual head elements in a multi-beam system, especially in the field.

There have been various proposals for dealing with some individual aspects of these problems (such as those disclosed in U.S. Pat. Nos. 5,239,528, 5,120,136, and 4,633,455). For example, an optical tape drive "including redundant optical heads to continue reading and writing data to an optical tape in the event of failure of one or more optical heads" is disclosed in U.S. Pat. No. 6,058,092. But no proposed solution or previous art addresses an integrated system, including the media and the head, that solves all of these problems and disadvantages of the prior art.

What is still desired is a new and improved optical tape system that provides the benefits of practical, low-cost pre-formatted optical disc media used with low cost commercially available optical heads, and provides high areal density and a longer operational lifetime. The new and improved optical tape system will also include the beneficial aspects of a linear media with a large storage surface area.

SUMMARY OF THE DISCLOSURE

Exemplary embodiments of the present disclosure provide an optical information storage system that includes pre-formatted optical data storage tape having pre-embossed information-bearing structures, and at least one optical disc head for reading recording marks in the pre-embossed information-bearing structures of the linear optical data storage media.

According to one aspect of the present disclosure, the pre-formatted optical data storage tape includes an elongated linear polymer layer having at least one pattern of optically readable embossments on at least one surface of the polymer layer, and an optical recording layer covering the pattern of optically readable embossments, wherein the optical recording layer is adapted such that recorded marks may be made in the recording layer by directing a focused source of energy into the recording layer.

A system constructed and operated in accordance with aspects of the present disclosure enables significant improvements relative to existing storage systems in terms of areal density, storage capacity, performance, and cost. The improved performance of the system described herein includes, but is not limited to, high storage capacity, improved media-drive interchange characteristics, fast data access times, high read/write rates, and archival media. Of particular significance is the benefit of a total storage capacity that is several orders of magnitude greater than any optical disc or magnetic tape system currently existing and which is obtained by combining the areal density of a pre-formatted optical disc media with the large storage surface area of a linear tape media.

These and other objects and features of this disclosure will be more clearly apparent from the following description when taken in conjunction with the accompanying drawings, briefly described below.

BRIEF DESCRIPTION OF THE DRAWINGS

Like reference characters designate identical or corresponding components and units throughout the several views.

DETAILED DESCRIPTION OF AN EXEMPLARY EMBODIMENT OF THE DISCLOSURE

Figure 1:
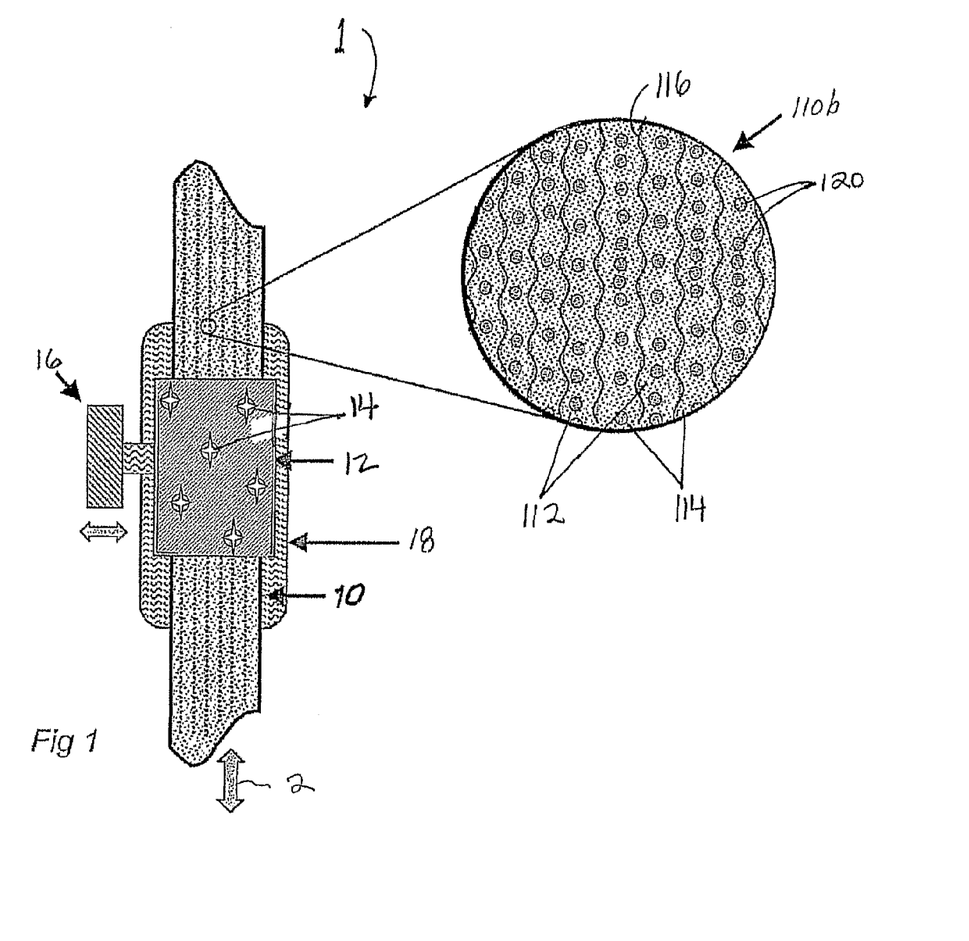
FIG. 1 shows a top plan view of a head-media area of an exemplary embodiment of an optical information storage system constructed in accordance with the present disclosure and including a pre-formatted optical storage tape and multiple optical heads.
Figure 2:
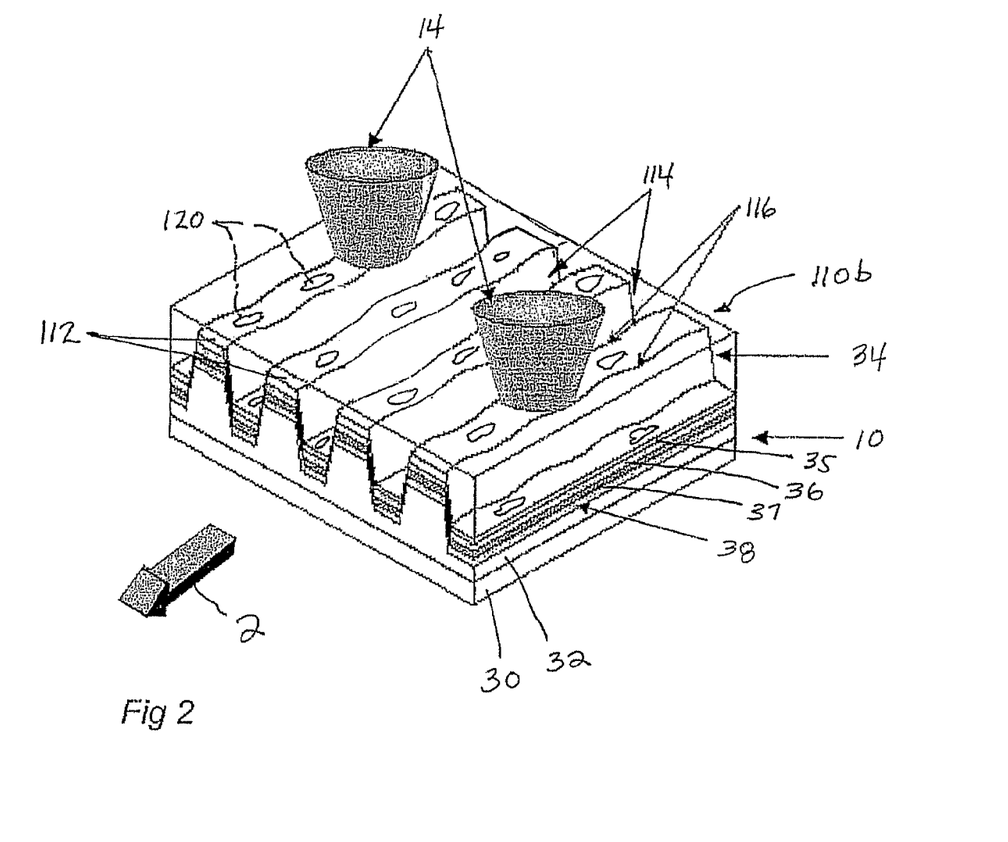
FIG. 2 shows an enlarged, perspective view, partially in section, of the pre-formatted optical storage tape and some of the optical heads of the system of FIG. 1.
Figure 3:
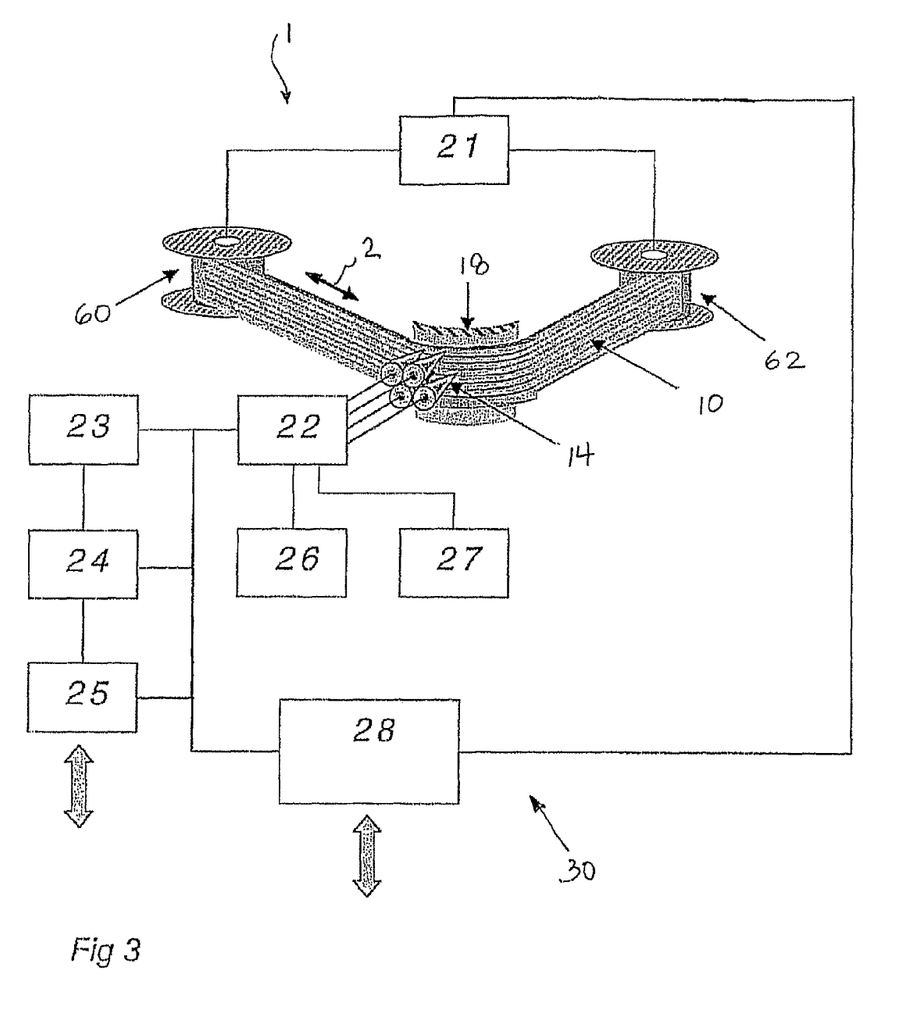
FIG. 3 shows a perspective view of the optical information storage system of FIG. 1, and further shows a block diagram of a controller arrangement of the system.

Referring to FIGS. 1 through 3, there is shown an exemplary embodiment of an optical information storage system 1 including a pre-formatted linear optical storage media, or pre-formatted optical data storage tape 10, constructed in accordance with the present disclosure. In particular, the pre-formatted optical data storage tape 10 comprises linear optical data storage media having pre-embossed information-bearing structures. The pre-formatted optical storage tape 10 of the present disclosure enables significant improvements relative to existing storage systems in terms of areal density, storage capacity, performance, and cost. The improved performance of the system described herein includes, but is not limited to, high storage capacity, improved media-drive interchange characteristics, fast data access times, high read/write rates, and archival media. Of particular significance is the benefit of a total storage capacity that is significantly greater than any optical disc or magnetic tape system currently existing and which is obtained by combining the areal density of a pre-formatted optical disc media with the large storage surface area of a linear tape media. The pre-formatted optical storage tape 10 is described in greater detail below, but first the optical information storage system 1 is described.

As shown best in FIG. 3, the optical information storage system 1 also includes an optical head array 12 for reading the pre-formatted optical data storage tape 10, a spool system 60, 62 for containing the pre-formatted optical data storage tape 10 and for moving the tape 10 with respect to the optical head array 12, and a control system 30.

The tape 10 is moved bi-directionally, as shown by arrow 2, with respect to the optical head array 12 by the spool system 60, 62. Referring to FIG. 1, the optical head array 12 includes independent optical head pickup units 14, such as those typically used in CD and DVD drives (not to scale), and the like, and is positioned over the tape 10. The tape 10, in turn, is supported by an air-bearing surface or the like backing plate 18, which supports and stabilizes the lateral and out-of-plane motion of the tape 10. The lateral movement (generally perpendicular to the tape direction) of the optical head array 12 is controlled by an actuator 16, as shown in FIG. 1. Focus and tracking is independently provided by each head pickup unit 14 and related control electronics and circuitry.

A simplified general block diagram of one exemplary embodiment of an overall system 1 of this disclosure is shown in FIG. 3. As shown, the pre-formatted optical tape 10 is transported bi-directionally over the tape backing support 18 by the synchronized action of the spools 60, 62, whose motors (not shown) are controlled by a controller unit 21. The array of optical head pickup units 14 (four shown for simplicity in this view) reads from and writes to individual preformatted tracks of the tape 10, as controlled by an optical head controller block 22. Each individual optical pickup unit 14 has a servo focus actuator 26 and tracking servo actuator 27 (typically incorporated into the head unit). System input/output is provided through interface block 25, which may utilize any of a number of high-speed standard interface protocols, such as fiber-channel, SCSI, or firewire. The system controller 28 provides the user interface as well as overall system task management. Other functions, such as compression/decompression and error correction are handled by the respective processing unit(s) 23, 24. It is clear from this example that any number of hardware configurations is possible in order to create a system based on the combination of optical pickup and pre-formatted linear information medium as provided by the present disclosure.

The pre-formatted optical data storage tape 10 is characterized by a thin (in the approximate range of 4 microns to 100 micron), elongated, tape-like substrate having a plurality of patterns of optically readable embossments (e.g., grooves) on at least one surface in order to provide position, tracking, etc. information to an optical head or pickup unit. The tape 10 also includes recording layers placed over the optically readable embossments of the substrate to facilitate reading or writing of user data on one or both surfaces using an energy source, such as a laser. The recording layer(s) belong to a class or classes of materials known to the art that changes one or more physical properties in response to exposure to laser or other actinic radiation, including particularly such radiation as would be emitted from an optical disc head. The aforementioned class of materials includes phase change and dye-polymer media. The pre-formatted optical data storage tape 10 of the present disclosure can be provided on open reels, cartridges, or cassettes having a single hub or dual hubs, or any of a number of configurations for storage, transport, and handling of the media.

Enlarged views of the tape 10 with pre-formatted structure are shown in FIGS. 1 and 2. The pre-format structure of the optical tape 10 comprises at least one pattern of optically readable embossments, which may extend parallel with a longitudinal center line of the tape. In the exemplary embodiment shown, the pre-formatted structure of the optical tape 10 comprises multiple patterns of optically readable embossments that extend parallel with each other and with the longitudinal center line of the tape. The use of multiple, parallel, linear formatted pattern allows for the simultaneous use of multiple head pickup units 14, and thus a faster transfer of data (in contrast, a typical CD has a single, spirally wound formatted track).

Figure 4:
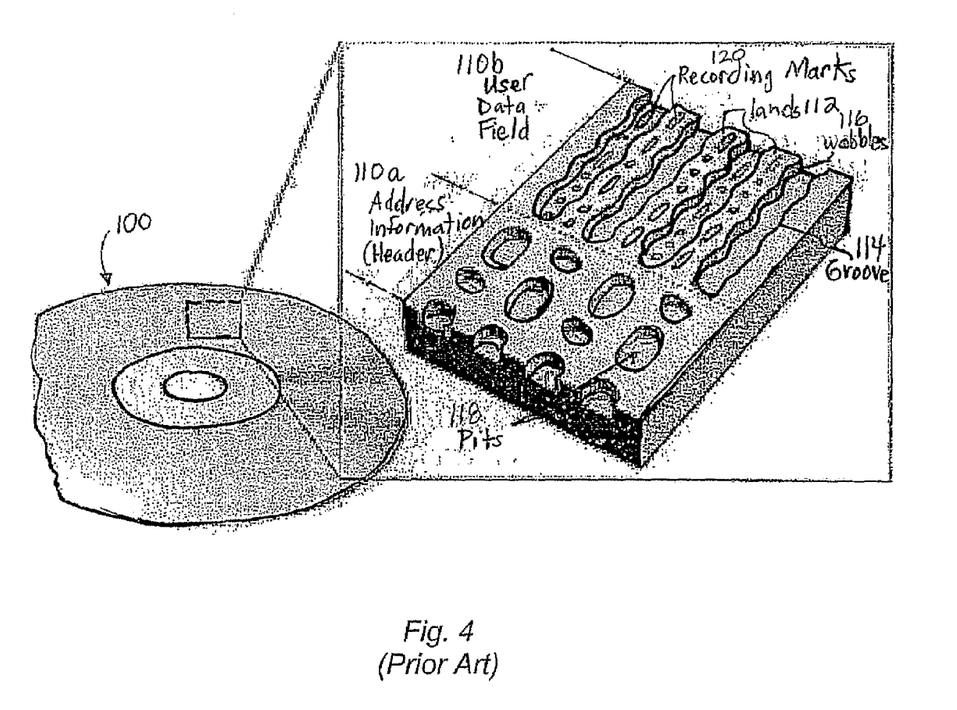
FIG. 4 shows an enlarged, cut-away view of an exemplary embodiment of a pre-formatted disc substrate according to the prior art.
Figure 5:
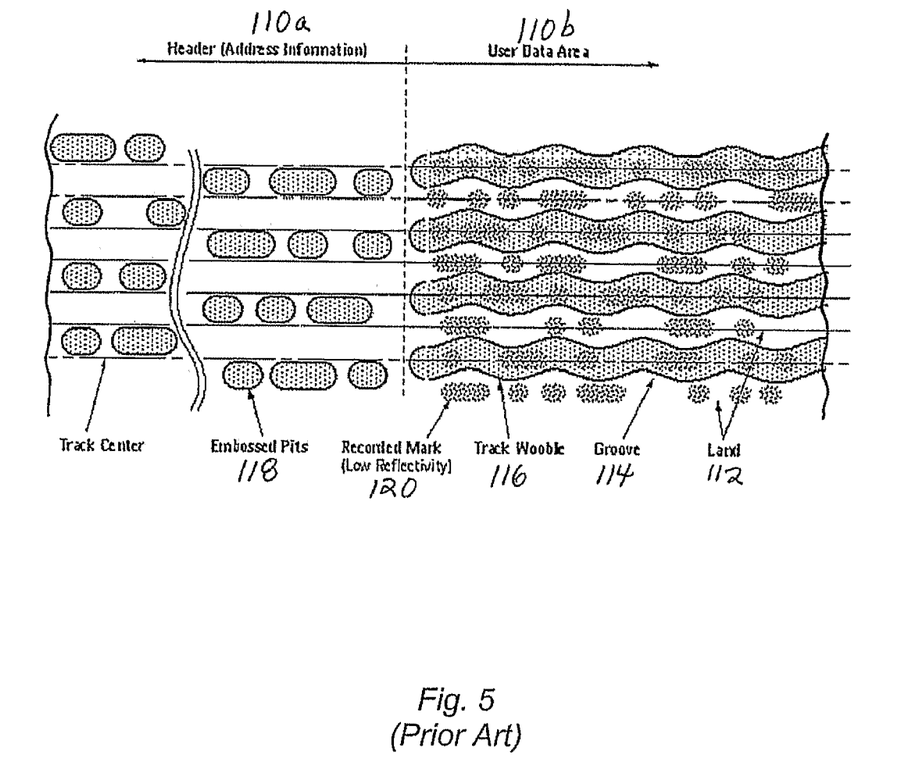
FIG. 5 is a plan view of the disc substrate of FIG. 4.
Figure 6:
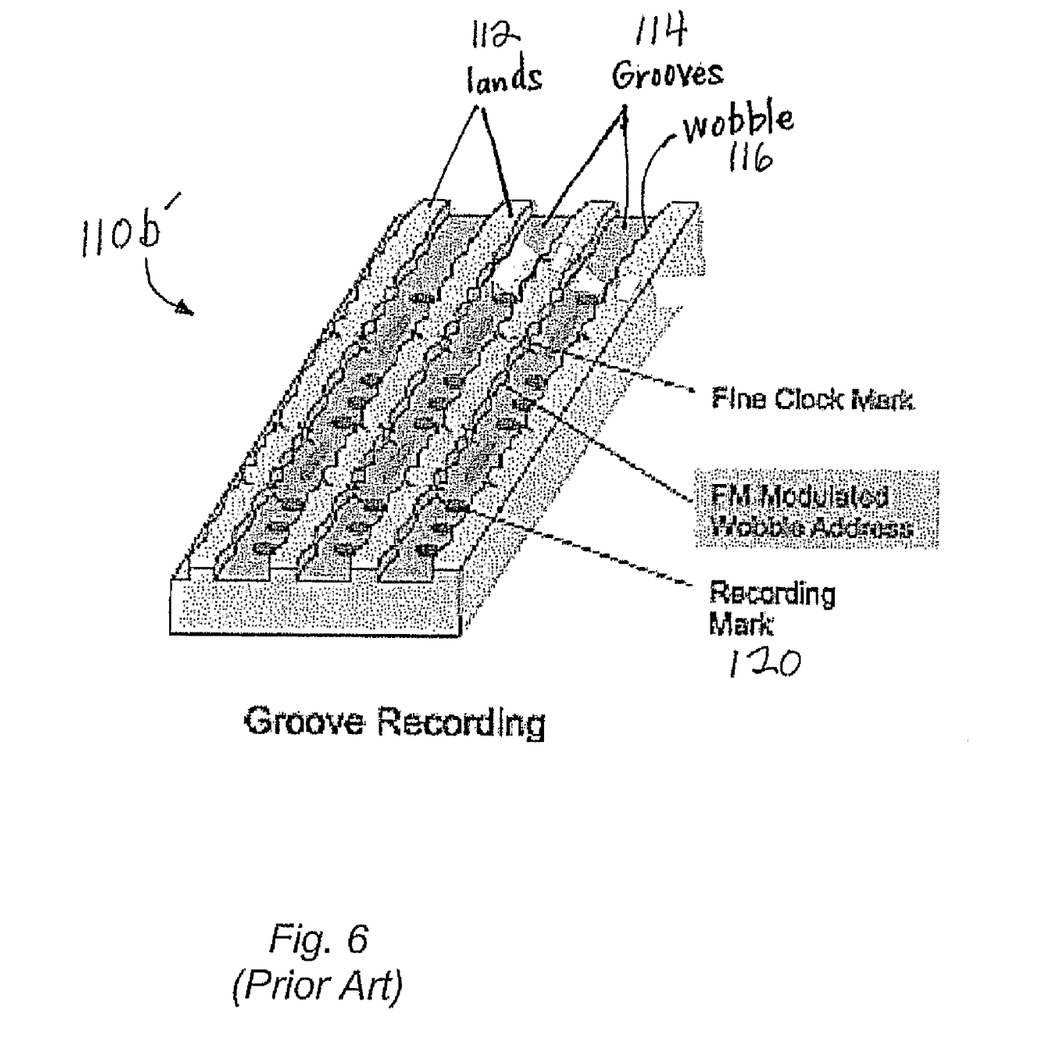
FIG. 6 shows an enlarged, cut-away view of another exemplary embodiment of a pre-formatted disc substrate according to the prior art.

The pre-format structure of the optical tape 10 can, for example, be similar to optical disc pre-format structures presently available in CDs and DVDs, examples of which are shown in FIGS. 4-6. It may be appreciated that, generally speaking, the optical disc head pickup units 14 do not recognize the patterns tracked as being circular or linear, since the radius of curvature of the disc track is very large compared to the width of the track. For all intents and purposes optical disc head pickup units, such as shown in "see" patterns of optically readable embossments. Thus, the optical head pickup units 14 normally used with discs can be used with the linear optical tape 10 with only some modifications. Such modifications may include the use of an optical compensator (e.g., a piece of glass or plastic) to correct the optical beam path for the "missing" disc substrate (typically 0.6 mm thick polycarbonate for DVDs), which can be bonded to the lens or interposed between the beam and substrate, for example.

As shown in FIGS. 1 and 2, the optical head pickup units 14 read formatted tracks comprising user data field 110b on the surface of the tape 10, and also read recording marks 120 on the formatted tracks. The optical head pickup units 14 also can be used to write recording marks 120 on the formatted tracks. In the exemplary embodiment shown, the formatted tracks of the user data field 110b can exhibit a great degree of complexity, including lands 112 and grooves 114, wherein side walls 116 of the grooves 114 are wobbled for tracking purposes, all contributing to the ability of such formatted media to achieve very high storage densities. Such features are created by use of molding processes generally known to the art. These or other features are similarly used in pre-formatted CD and DVD media, to enable recording of marks 120 by the user using the "off-the-shelf" CD or DVD-type opto-electronics units. In the exemplary embodiment shown in FIGS. 1 and 2, the recording marks 120 are placed on both the lands 112 and in the grooves 114. It should be noted that, in addition to pre-format structures similar to those used in CD/DVD discs, other pre-format structures and schemes can also be used.

Various coatings are placed over the pre-formatted optical data storage tape 10 and may include layers with reflective, dye polymer, WORM, erasable, protection or the like functionality. In the exemplary embodiment shown in FIG. 3, the tape 10 includes a carrier layer 30 (such as polyethylene terephthalate, PET, polyethylene naphthalate, PEN, or other) which is selected for physical strength and durability, and a polymer layer 34 (such as polycarbonate, acrylic, cellulose acetate butyrate or the like), which is selected for replication of the formatted tracks with high resolution. An intermediate layer with a combination of carrier and polymer layer to provide enhancement of adhesion between the carrier and polymer layers may also be provided.

Several layers of thin-film coatings comprise a phase change stack, and include the following layers for example, in order from the read/write incident surface, there first being a protective overcoat layer 34 (polymeric or inorganic), an outer dielectric layer 35, a phase change recording layer 36 (typically a Te alloy), another dielectric layer 37, and a reflection/thermal control/nucleation layer 38. The aforementioned individual layers of such a phase change stack are known to the art as might general constitute rewritable and/or write-once layers as used in existing CDs and DVDs. It should be noted, however, that an embodiment of the pre-formatted optical data storage tape 10 of this disclosure in which the tape is read from the "first surface" (radiation incident on the features-containing surface of the tape), the order, thickness and composition of said layers is different from those used in existing optical discs, wherein in existing optical discs such layers are designed to operate as second-surface (substrate-incident) devices. It should also be noted that the layers of the pre-formatted optical data storage tape 10 can be varied in number, composition, thickness, etc. to operate in a write once or erasable mode. These layers can also be contrived to have either write-once (i.e., cannot be altered after user data is written) or erasable (user can erase and re-use media) characteristics. In another embodiment of the tape medium, a dye-based recording means, such as is known to the art in regard to so-called "write-once" CDs and DVDs, is used in place of the phase-change layers.

The pre-formatted optical data storage tape 10 can also include one or more back coat layers on the side opposite the format side. The back coat layers may include single or multiple layers for friction and/or surface control with the film support/guide member 18 (over which the substrate moves during the read/write process), and the front media surface to back media surface contact as occurs on the unwind and rewind spools 60, 62. Friction control may include the use of specific surface textures and materials on the back surface, either by application of a layer to provide such surface quality, embossing such a texture to said surface, or use of additives in a coating process to create the desired texture. The same or similar surface replication process as used to create the format on the front surface can be used to create a specific texture on the back surface. The back coat layers may include single or multiple layers for providing optimal thermal conductivity. Back coat layers with appropriate thermal properties can be applied by vacuum deposition (such as metallic coatings, for example), as well as by aqueous or solvent coating processes known to the art, or by application of radiation-cured polymeric materials into which thermal control additives may optionally be included (in addition to the previously-mentioned texture control purposes). The back coat layers may include single or multiple layers for providing dissipation of static electricity. Such layers may comprise vacuum-deposited electrically conductive coatings (such as metals and transparent conductive materials including indium-tin oxide). It should also be noted that these and other benefits of the back coat can be combined, such that one or more layers can be used to produce a textured surface with an metallic, vacuum-deposited overcoat that is beneficial for friction, thermal, and static electricity discharge. It should also be noted that the thermal, electrical, and friction control that is afforded by single or multiple applied back coat layers can also be accomplished by incorporation of polymeric or inorganic materials into the carrier layer 30, or co-extruded during the manufacturing process thereof.

The pre-formatted optical data storage tape 10 can include format structures and features readable by DVD-type optical head(s), such as DVD-RW, DVD-R, DVD+RW, DVD+R, DVD-RAM as well as other format types. Such optical heads may include modifications to accommodate adjustments necessary for conversion from rotational to a linear format and for changes in optical path length cause by, for example, differences in the overcoat or cover sheet thickness overlaying the optically sensitive surface as compared to the standard optical disc media, as previously mentioned. The pre-formatted structures can also can include formats such as are characteristic of CD, magneto-optical disc, and similar discs. The pre-format pattern can include any of a number of general format configurations, including continuous groove, land and groove, sampled servo, wobble groove, distributed digital servo (as disclosed in U.S. Pat. No. 5,452,285), or the like. Pre-format features typically include track structures, header information, servo and error correction information, and may also include pre-recorded digital and/or analog information.

The layer(s) that are applied to the formatted tape 10 may include one or more of the following functionalities: write-once (WORM), erasable, PROM (read-only and recordable combined), or read-only (ROM). The recordable and/or erasable layers can be based on phase change (as disclosed in U.S. Pat. Nos. 4,981,772 and 5,077,181), dye-polymer (as disclosed in U.S. Pat. No. 5,382,463), or any such layer or layers that are sensitive to the radiation of the appropriate optical head. The layers for ROM functionality can be comprised of aluminum or gold or other materials of appropriate reflectivity.

In one exemplary embodiments of the system 1 of the present disclosure, the optical media and appropriate optical head/drive components incorporate other recording, detection, and information encoding schemes including, but not limited to, grayscale (multi-level), near field, fluorescent, volumetric, holographic, or any other such means (e.g., as disclosed in ISOM/ODS *Conference on Optical Data Storage*, July 2002, HI). Another embodiment includes a drive system with read-only optical heads, which would be advantageous for readout of permanent (ROM) data, or for applications requiring playback only functionality (such as content distribution, entertainment, security, etc.), where for example the ability to write to the medium may be undesirable. In another embodiment, an optical pickup unit (or units) having multiple beams from a single head may be employed (for example, by Zen Research, Inc., 20400 Stevens Creek Blvd, Suite 800, Cupertino Calif.), where such a multi-beam head may be used to increase the data rate, or for redundancy. Another embodiment of the system of this disclosure utilizes a combination of ROM and recordable functionality, which may, for example, include pre-recorded information as well as user-recordable areas, for incorporation of software, security codes, and unlockable content (MP3 and video content). One such example includes an array of low-power ROM heads with one or more higher-power record/erase heads for recording user data or for applying tape security serialization.

The pre-format structures of the optical data storage tape 10 can include a wide variety of features, including lands, grooves, pits, data and ROM information, etc. Such features can be either recessed or proud relative to the plane of the substrate, and can be in the nanometer regime of critical dimensions. In addition, both sides of the pre-formatted optical data storage tape 10 can be utilized, such as having a recordable or ROM layer on either or both sides or layers with different functionalities (WORM, erasable, ROM) on different sides.

Now referring to FIGS. 4 and 5, an enlarged, cut-away view of an exemplary embodiment of a pre-formatted optical disc (e.g., a DVD or CD) substrate 100 according to the prior art is shown and includes pre-formatted surface patterns 110a, 110b. These types of pre-formatted surface patterns 110a, 110b and the appropriate optical disc head and electronics, when used together, form the basis of optical disc data storage systems currently used for data and/or video storage, and the like. According to the present disclosure, pre-formatted surface patterns that are similar to the pre-formatted surface patterns 110a, 110b of the prior art and the appropriate optical disc head and electronics of the prior art are used with the pre-formatted optical data storage tape 10 of the present disclosure, as shown for example in FIGS. 1-3. Appropriate modifications can be made to account for the differences in disc media and linear media as seen by an optical head, including compensation for differences in optical path length caused by the thinner cover layer in the linear media relative to the disc media. Such modifications may include, for example, placing a small piece of material, such as polycarbonate, in the optical path of the lens in order to provide the requisite 0.6 mm optical path length, in the case of the DVD, for which the pickup optics were originally designed. Changes in detection signal polarity (for write bright versus write dark recording schemes) or tracking/servo electronics (to compensate for format changes necessitated by the pattern of optically readable embossments structure) may also be applied to such "off-the-shelf" opto-electronics units.

It can be seen from the exemplary embodiment shown in FIGS. 4 and 5 that the pre-formatted surface patterns 110a, 110b of the disc 100 can exhibit a great degree of complexity, including lands 112, grooves 114, wobble grooves 116, pits 118, and various fine structures, all contributing to the ability of such formatted media to achieve very high storage densities. Such features are not readily created by use of high-throughput post-manufacturing formatting (sometimes referred to as "servo-writing") processes. One of the pre-formatted surface patterns 110a comprises an address information header, which is used by "off-the-shelf" opto-electronics units to determine the position on the recording media, while the other pre-formatted surface pattern 110b comprises a user data field, upon which recording marks 120 can be created by "off-the-shelf" opto-electronics units.

In the exemplary embodiment shown in FIGS. 4 and 5, the recording marks 120 are placed on both the lands 112 and in the grooves 114. FIG. 6 shows another exemplary embodiment of a pre-formatted disc substrate 100 according to the prior art, and including a pre-formatted surface pattern 110b' comprising a user data field. The pre-formatted surface pattern 110b' of FIG. 6 is similar to the pre-formatted surface pattern 110b of FIGS. 4 and 5 such that similar elements have the same reference numerals. In the pre-formatted surface pattern 110b' of FIG. 6, however, the recording marks 120 are placed just in the grooves and not on both the lands 112 and the grooves 114. The pre-formatted surface pattern 110b' of FIG. 6 can also be applied to the linear optical media of the present disclosure, as shown for example in FIGS. 1-3.

In order to describe the benefits of pre-formatting linear storage media, a comparison can be made to a typical common optical disc type, the DVD. The useable area of a typical 120 mm diameter optical disc (93 cm$^2$) is equivalent to about ¾ m of a standard (12.5 mm) width tape. Thus, by incorporating a DVD-like format (and using appropriate optical heads, etc.) into the tape medium of this disclosure, the total storage capacity of a single cartridge containing 1,000 in of standard ½-inch tape, for example, would be 6,300 GB (6.3 terabytes, or TB). For comparison, a single surface of a typical DVD holds 4.7 GB of information. The use of blue lasers or other modifications under development by DVD manufacturers can further increase this capacity by a factor of 6.

The use of a format containing DVD-like format features enables reading and writing of the pre-formatted optical data storage tape 10 with DVD heads, having electrical and/or optical modifications as necessary to accommodate modifications or improvements of the embedded format. Due to the linear nature of these features, the use of multiple optical heads or groups of heads is also disclosed. Each head can utilize its intrinsic focus and tracking capabilities independently in order to accommodate any track-to-track variation, etc. The multiplicity of optical heads can be arranged in a manner so as to maximize the number of heads in order to achieve a maximum data rate. It may be appreciated that use of smaller optical head assemblies will enable more heads and a higher data rate. Furthermore, the optical heads can be arranged within a head assembly fixture 12 such that each head can read and/or write a number of tracks without requiring the fixture to move. Alternatively, the fixture can be designed to move in a direction generally across the tape in order to enable the heads to access a larger range of tracks (particularly if a single head is used). The use of existing electro-optic components, such as optical disc heads incorporating auto focus, servo tracking, etc., greatly reduces the cost of the read-write head(s) in the companion drive hardware for this tape format, especially if multiple heads are used.

It should be understood that the embodiments of the present disclosure described herein are merely exemplary and that a person skilled in the art may make variations and modifications to the embodiments described herein without departing from the spirit and scope of the present disclosure. All such equivalent variations and modifications are intended to be included within the scope of this disclosure as defined by the appended claims. None of the present disclosure is meant to be disclaimed.

What is claimed is:

1. A pre-formatted optical data storage tape comprising:
    an elongated linear polymer layer having at least one pattern of optically readable embossments on at least one surface of the polymer layer; and
    an optical recording layer covering the pattern of optically readable embossments of the elongated linear polymer layer, wherein the optical recording layer is adapted such that recorded marks may be made in the recording layer by directing a focused source of energy into the recording layer.

2. A pre-formatted optical data storage tape according to claim 1, wherein the tape is provided on one of an open reel, a cartridge, a cassette having a single hub, and a cassette having dual hubs.

3. A pre-formatted optical data storage tape according to claim 1, wherein the tape has a thickness of between 4 microns and 1000 microns.

4. An optical information storage system including the tape of claim 1, and further comprising:
    an optical head array adapted to read the pattern of optically readable embossments on the optical data storage tape and any recorded marks made in the recording layer; and
    a transport system for moving the tape with respect to the optical head array.

5. An optical information storage system according to claim 4, further comprising an optical compensator positioned between the optical head array and the optical data storage tape.

6. An optical information storage system according to claim 4, wherein the optical head array is adapted to write recording marks in the recording layer of the optical data storage tape.

7. A pre-formatted optical data storage tape according to claim 1, wherein the pattern of optically readable embossments include lands and grooves.

8. A pre-formatted optical data storage tape according to claim 1, wherein the recording layer provides at least one of reflective, dye polymer, write-once (WORM), erasable, PROM (read-only and recordable combined), read-only (ROM), and protection functionality.

9. A pre-formatted optical data storage tape according to claim 1, wherein the polymer layer comprises at least one of polycarbonate, acrylic, cellulose acetate butyrate, styrene, polyvinyl chloride, radiation-curable photopolymer, and formable polymer.

10. A pre-formatted optical data storage tape according to claim 1, further comprising a carrier layer supporting the polymer layer.

11. A pre-formatted optical data storage tape according to claim 10, wherein the carrier layer comprises one of polyethylene terephthalate (PET), polyethylene naphthalate (PEN), polyimide, and polyaramid.

12. A pre-formatted optical data storage tape according to claim 1, wherein the polymer layer includes a plurality of the patterns of optically readable embossments and wherein the patterns are parallel.

13. A pre-formatted optical data storage tape according to claim 1, wherein the recording layer comprises a dielectric layer, a phase change recording layer, and a reflection/thermal control/nucleation layer.

14. A pre-formatted optical data storage tape according to claim 1, further comprising a back coat layer secured to a surface of the elongated linear polymer layer opposite the surface of the polymer layer having the pattern of optically readable embossments, and wherein the back coat layer is adapted for at least one of friction control, thermal conductivity, and dissipation of static electricity.

15. A pre-formatted optical data storage tape according to claim 1, wherein the pattern of optically readable embossments includes features readable by DVD-type optical heads.

16. A pre-formatted optical data storage tape according to claim 1, wherein the pattern of optically readable embossments includes at least one of header information, servo and error correction information, pre-recorded digital information, and pre-recorded analog information.

17. A pre-formatted optical data storage tape comprising:
    an elongated linear polymer layer having a plurality of parallel patterns of optically readable embossments on at least one surface of the polymer layer; and
    a recording layer covering the patterns of optically readable embossments of the elongated linear polymer layer, wherein the recording layer is adapted such that recorded marks may be made in the recording layer by directing a focused source of energy into the recording layer.

18. An optical information storage system including the tape of claim 17, and further comprising:
    a laser head array adapted to read the patterns of optically readable embossments on the optical data storage tape and any recorded marks made in the recording layer; and
    a system for moving the tape with respect to the laser head array.

19. An optical information storage system according to claim 18, wherein the laser head array is adapted to write recording marks in the recording layer.

20. A pre-formatted optical data storage tape according to claim 17, wherein the patterns of optically readable embossments include lands and grooves, and wherein side walls of the grooves are wobbled for tracking purposes.

21. A pre-formatted optical data storage tape according to claim 17, wherein the patterns of optically readable embossments include at least one of header information, servo and error correction information, pre-recorded digital information, and pre-recorded analog information.

* * * * *